United States Patent
Ito

(10) Patent No.: US 8,508,799 B2
(45) Date of Patent: Aug. 13, 2013

(54) PRINTING APPARATUS AND PRINTING METHOD FOR FORMING IMAGE USING A FIRST PRINT MATERIAL AND A SECOND PRINT MATERIAL

(75) Inventor: Nobuyasu Ito, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 267 days.

(21) Appl. No.: 12/980,042

(22) Filed: Dec. 28, 2010

(65) Prior Publication Data

US 2011/0170123 A1 Jul. 14, 2011

(30) Foreign Application Priority Data

Jan. 8, 2010 (JP) .................................. 2010-002814

(51) Int. Cl.
*G06F 15/00* (2006.01)
(52) U.S. Cl.
USPC ............................. 358/1.9; 358/1.16; 399/341
(58) Field of Classification Search
None
See application file for complete search history.

(56) References Cited

U.S. PATENT DOCUMENTS

| 5,548,390 A | 8/1996 | Sugisaki et al. ............. 355/319 |
| 6,016,387 A * | 1/2000 | Yoshida ....................... 358/1.16 |
| 2002/0015177 A1 | 2/2002 | Yamakado et al. ........... 358/1.15 |
| 2004/0028436 A1 | 2/2004 | Suzuki et al. ................ 399/381 |
| 2006/0222378 A1 | 10/2006 | Julien .............................. 399/2 |
| 2007/0280760 A1 * | 12/2007 | Nishikata et al. ............. 399/341 |
| 2008/0079963 A1 * | 4/2008 | Matsubara ..................... 358/1.9 |
| 2008/0260447 A1 * | 10/2008 | Horiuchi ....................... 400/605 |
| 2008/0278735 A1 | 11/2008 | Wang et al. .................... 358/1.5 |
| 2009/0097046 A1 | 4/2009 | Ohta et al. |
| 2010/0097656 A1 | 4/2010 | Misawa et al. |

FOREIGN PATENT DOCUMENTS

| JP | 2007-11028 | 1/2007 |
| JP | 2007-21759 | 2/2007 |
| JP | 2008-139589 | 6/2008 |

OTHER PUBLICATIONS

European Search Report dated Nov. 15, 2011 in corresponding European Application No. 11150430.4.
Chinese Office Action dated May 9, 2013 for Chinese Appin No. 201110020395.8, with English translation.

* cited by examiner

*Primary Examiner* — Twyler Haskins
*Assistant Examiner* — Helen Q Zong
(74) *Attorney, Agent, or Firm* — Fitzpatrick, Cella, Harper & Scinto

(57) ABSTRACT

A printing apparatus comprising a first engine for performing a print using a first print material connectable to a feed unit of a second engine for performing a print using a second print material is provided. The printing apparatus comprise a first controller configured to control the first engine and a second controller configured to control the second engine. Power control unit of the second controller configured to restrict consumption power of the image processing unit of the second controller in a case that transmitted information for the second engine from the first controller does not include the data to be processed by the second engine.

10 Claims, 14 Drawing Sheets

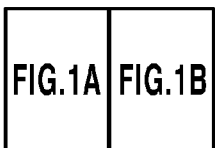
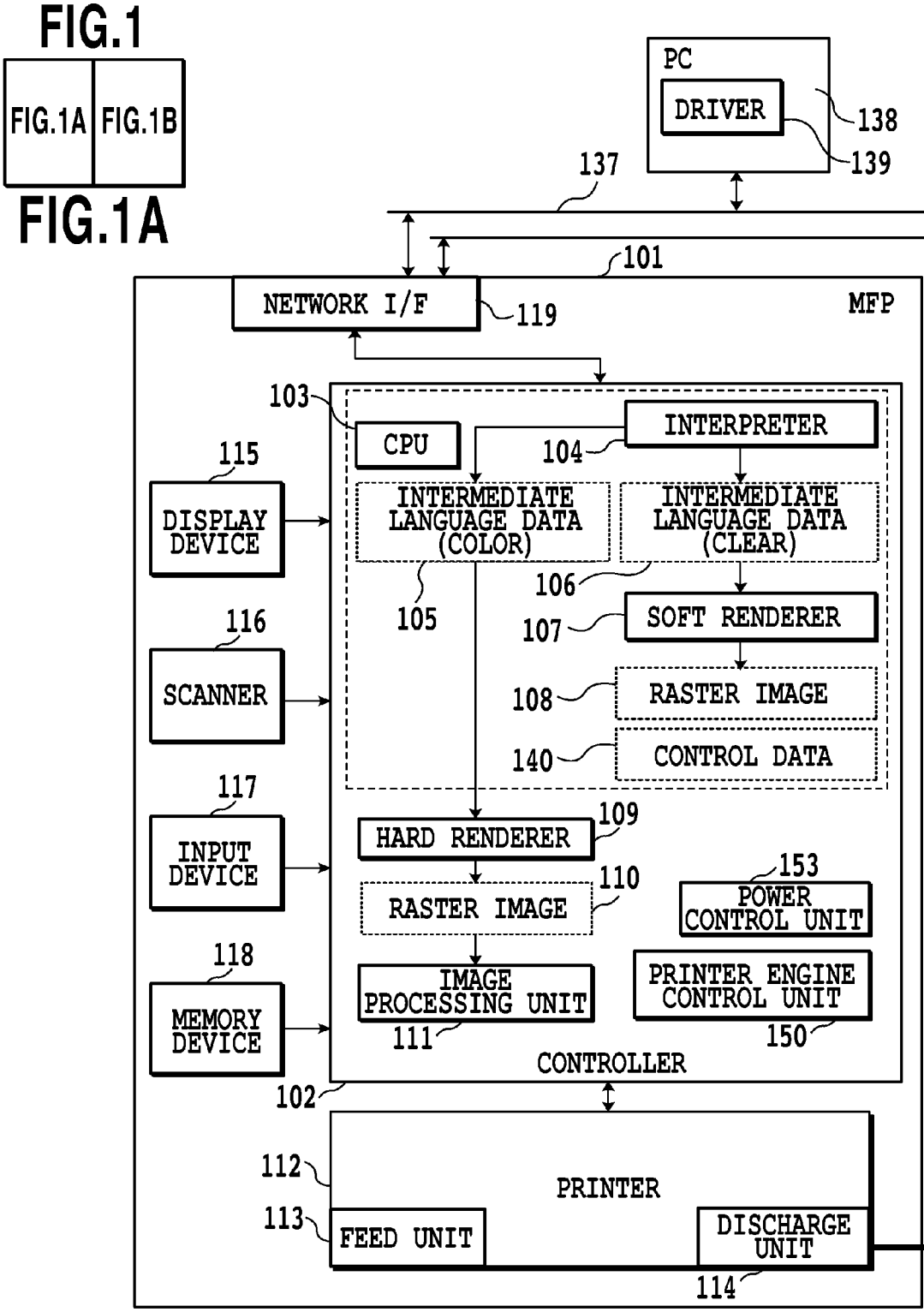
FIG.1

| NO | FLAG FOR PRESENCE/ABSENCE OF CMYK IMAGE | FLAG FOR PRESENCE/ABSENCE OF SPECIAL COLOR IMAGE | CMYK CONTROLLER | SPECIAL COLOR CONTROLLER | REMARKS |
|---|---|---|---|---|---|
| 1 | 1 | 1 | active | active | 1st page |
| 2 | 1 | 0 | → | sleep | NO SPECIAL COLOR IMAGE DATA |
| 3 | 1 | 1 | → | active | PRESENCE OF IMAGE DATA OF BOTH |
| 4 | 1 | 0 | → | sleep | NO SPECIAL COLOR IMAGE DATA |
| 5 | 0 | 0 | sleep | sleep | BLANK PAGE (BREAKPOINT OF CHAPTER AND THE LIKE) |
| .. | 1 | 1 | active | active | PRESENCE OF IMAGE DATA OF BOTH |
| .. | .. | .. | .. | .. | .. |
| X | 0 | 1 | sleep | active | SPECIAL COLOR IMAGE DATA ONLY |
| .. | .. | .. | .. | .. | .. |
| N | 1 | 1 | active | active | FINAL DATA |

FIG.5

PRINTING APPARATUS AND PRINTING METHOD FOR FORMING IMAGE USING A FIRST PRINT MATERIAL AND A SECOND PRINT MATERIAL

BACKGROUND OF THE INVENTION

1. Field of the Invention

The present invention relates to a printing apparatus for forming an image on one sheet with a first toner and a second toner by using a plurality of printing apparatuses, a printing method for the printing apparatus, and a program for executing the printing method.

2. Description of the Related Art

There is recently proposed a printing apparatus using a clear toner as a special printing material. The clear toner is a transparent printing material having the feature of adding a transparent image. Use of the clear toner enables various kinds of expressions to improve an added value of an output object. A mechanism for adding the clear toner in addition to a color toner of CMYK and the like is incorporated in the printing apparatus, thus making it possible to produce the output object using the clear toner by a single printing apparatus.

This type of apparatus, however, raises a problem that in performing a print using the special printing material such as the clear toner, a total toner amount used for the printing greatly increases as compared to a conventional print using the four-color toner.

Particularly in a case of adapting this type of apparatus to a color print of an electrophotographic process, a special printing material image is formed on an intermediate transfer member in addition to the conventional toner image of four colors of C, M, Y and K, and it is necessary to further transfer each of the formed images on a sheet.

An increase in a toner application amount as a toner amount necessary for the printing in each electrophotographic process causes an application of great loads to each process.

For example, Japanese Patent Laid-Open No. 2007-011028 discloses a method of calculating an application amount of the printable special printing material from a toner application amount of four colors of C, M, Y and K for eliminating the load of each process. However, when the application amount of the special printing material is calculated by the method disclosed by Japanese Patent Laid-Open No. 2007-011028, there are some cases where the application amount of the special printing material becomes zero. For example, in some cases a total application amount of the four-color toner exceeds a total application amount appropriately fixable and allowable on a sheet by a printer.

In such a case, even if a user instructs a print using the special printing material, since it is not possible to perform the print using the special printing material according to the user's instruction, the visual effect by the special printing material can not be obtained. For overcoming this problem, Japanese Patent Laid-Open No. 2008-139589 changes a method of forming the special printing material image when it is determined that it is not possible to perform the print using the special printing material according to the user's instruction by one time of the fixation.

According to the technology of Japanese Patent Laid-Open No. 2008-139589, first an image is printed and fixed on a sheet by using a toner other than a special printing material, and the sheet is outputted. In addition, on the sheet on which the image is printed by using the toner, the image is once more printed and fixed using the special printing material. The print by twice of the fixation is called a two-pass print. When the two-pass print is adopted, it is possible to perform a print using an amount of the special printing material more than an amount of the special printing material determined considering a total application amount allowable by the printer. Therefore, an output object having the visual effect by the special printing material desired by the user can be obtained.

It is possible to overcome the problem such as a limit of the toner amount by thus introducing the mechanism adapted for the clear toner. However, to a user not using the clear toner, the mechanism adapted specifically for the clear toner is useless in view of costs or functions.

Therefore, there is configured a system in which a printing apparatus using a color toner and a printing apparatus using a special printing material are provided as separate bodies, and a discharge unit in the printing apparatus using the color toner is connected to a feed unit in the printing apparatus using the special printing material to produce an output object using the special printing material together. In addition, for example, the system in which the printing apparatus using the color toner and the printing apparatus using the special printing material are connected is provided to a user who uses the special printing material. On the other hand, to a user not using the special printing material, only the printing apparatus using the colored tonner is provided. Thus producing the mechanism connecting the two printing apparatus allows the buildup of the system suited to a demand of a user.

However, since the structure of connecting the two printing apparatuses for use is provided with a controller for each engine, electrical power as much as that of two controllers results in being consumed all the time during the forming of the image data. According to such control, upon performing a print using only four colors CMYK of a color toner without an image data of a special color using a special printing material, control power corresponding to the two controllers is required. In this way, efficient power saving control of the controller is not conventionally performed. Further, even if a printing apparatus which has the structure of connecting the those two printing devices for use is provided, electrical power as much as that of two printing devices results in being consumed all the time. In this way, efficient power saving control of is not performed.

SUMMARY OF THE INVENTION

For solving the above problem, the present invention in its first aspect provides a printing apparatus comprising a first engine for performing a print using a first print material connectable to a feed unit of a second engine for performing a print using a second print material. The apparatus comprising: a first controller configured to control the first engine; and a second controller configured to control the second engine.

The first controller comprises obtaining unit configured to obtain a plurality of pages of image data for printing; generating unit configured to generate, by analyzing the obtained image data, information for the second engine including at least information showing whether or not each page in the obtained image data is to be processed by the second engine; transmitting unit configured to transmit the generated information for the second engine to the second controller of the second engine; and control unit configured to perform control in such a manner that the second controller obtains the generated information in regard to Nth page of image data, where N is an integer of 2 or more, before the second controller performs image processing on data to be processed by the second engine for performing a print of "N−1"th page of image data using the second print material. The second controller comprises: image processing unit configured to perform the image processing on the data to be processed by the second engine; and power control unit configured to restrict consumption power of the image processing unit in a case that the transmitted information for the second engine does not include the data to be processed by the second engine.

According to the present invention, by analyzing the image data to dynamically control the power in each controller, the power saving of the printing apparatus can be efficiently achieved.

Further features of the present invention will become apparent from the following description of exemplary embodiments with reference to the attached drawings.

BRIEF DESCRIPTION OF THE DRAWINGS

FIG. 1 is a diagram showing the relationship of FIGS. 1A and 1B;

FIGS. 1A and 1B are construction diagrams of a system according to an embodiment of the present invention;

FIG. 5 is a diagram showing the data construction configured by adding flag information analyzed by an interpreter according to the embodiment of the present invention;

DESCRIPTION OF THE EMBODIMENTS

Before explaining embodiments of the present invention, the meaning of eliminating the consumption power will be further explained as a general matter. Recently, for tougher competition, there is a need for timely putting various kinds of products into the market by shortening a cycle of product development and sharing a plurality of multi function printer (hereinafter, called MFP) engines for use on the same platform. Under such circumferences, for performing matching to a characteristic of color reproducibility different for each MPF, there are increasing cases of adopting FPGA which can rewrite hardware logic in an image processing unit. Further, there are needs for high quality of an image grade and high-speeding of a print speed. For realizing these needs, there occur the necessity of increasing a circuit scale and the necessity of increasing a band rate in image data transfer between a printing apparatus and an external memory. In this way, there is a tendency that an operational frequency is also high-speedy and followed by it, the consumption power also increases. Therefore, it is necessary to efficiently eliminate a consumption amount of power in an entire system.

Hereinafter, the best mode of carrying out the present invention will be explained with reference to the attached drawings.

In the following embodiment, a clear toner is used as a special printing material, but a print material to be used is not limited to the clear toner. For example, in addition to the clear toner, a light color toner, a special color toner of red or green, or other transparent printing materials such as transparent ink may used. In addition, the clear toner means a transparent printing material having the feature of adding a transparent image. An image region where a print is performed using this clear toner is difficult to see. Further, use of the clear toner allows glossiness or luster different from a print performed using only the color toner.

The printing apparatus in the following embodiment will be explained by taking an MPF for realizing a plurality of functions such as copying, printing and faxing with a single apparatus, as an example, but not limited thereto, any printing apparatus which can print and output an inputted print data may be used.

Embodiment 1

The present embodiment will be explained using an image forming system configured by connecting an MFP using a color toner as a color material to an MFP using a clear toner as the color material. It should be noted that the system in which two MFPs are connected may be regarded as a single printing apparatus.

Figure 1B:
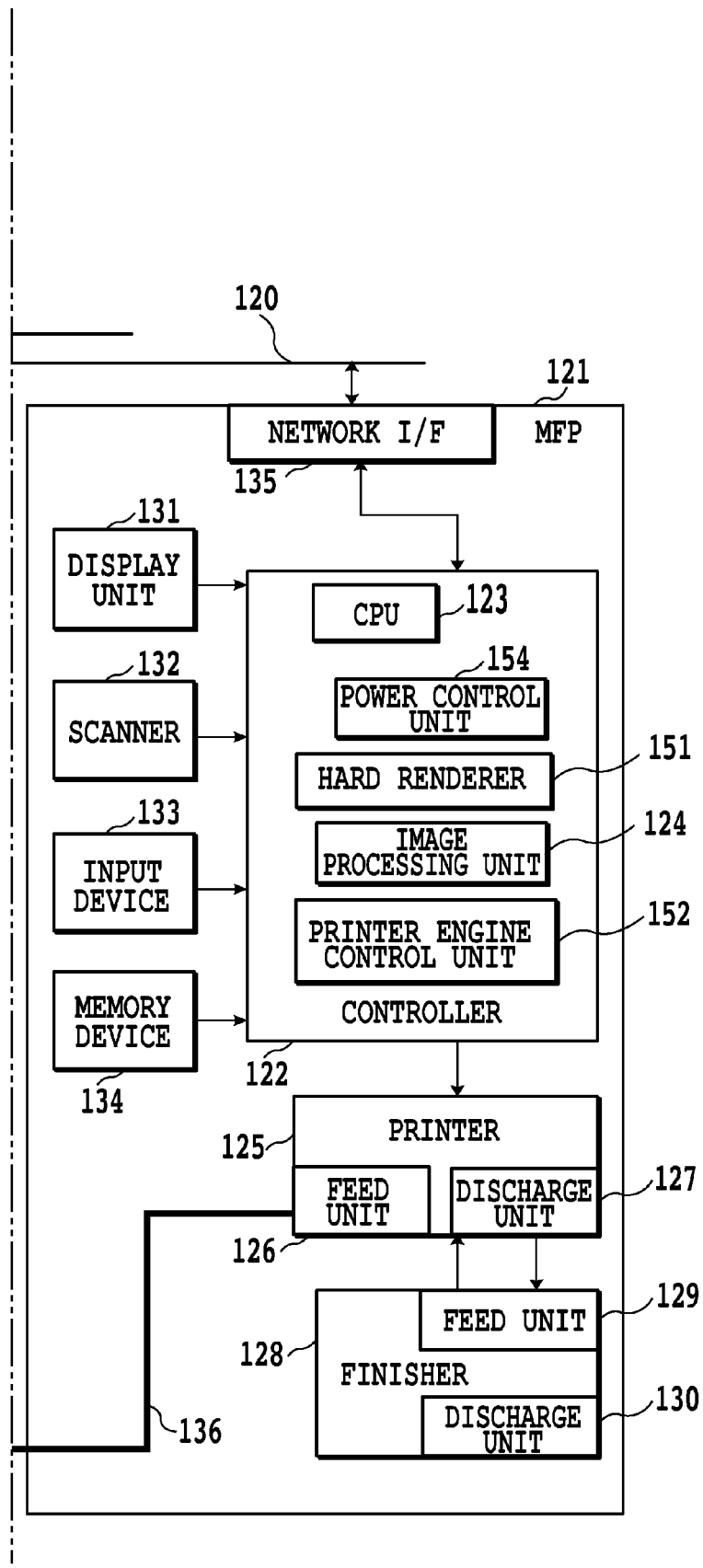

FIGS. 1A and 1B are an example of construction diagrams of the system according to the present embodiment. A first MFP 101 prints a first print data (first print material) using a color toner as a first color material such as cyan, magenta, yellow or black. A second MFP 121 prints a second print data (first print material) using a second color material. These two MFPs are connected through a network 120. The toner used by the first MFP 101 is not limited to the color toner, but may be a monochromatic toner or the like. Likewise, the toner used by the second MFP 121 is not limited to the clear toner, but may be a special color toner or the like. That is, each toner used in each MFP may be each toner in a combination of toners which possibly influence the fixing processing in a case of being used in the same MFP.

A discharge unit 114 of the first MFP 101 is connected through a connecting unit 136 to a feed unit 126 of the second MFP 121, and a sheet discharged from the first MFP 101 can be automatically fed by the second MFP 121.

If sheets on each of which a print is completed by the first MFP 101 are sequentially loaded on the connecting unit 136 after printed, when the second MFP 121 feeds a sheet from the plural sheets loaded on the connecting unit 136, it is required to take out the sheet discharged at the bottom side among the plural loaded sheets. In this case, the feeding is not made well, therefore possibly generating sheet jamming or breaking consistency of the sheet print order.

Therefore, in the connecting unit 136 the timing of feeding and discharging is controlled as follows. One sheet on which a print by a printer 112 of the first MFP 101 is completed and which is printed by a color toner is discharged to the discharge unit 114, and then the one sheet is conveyed to the connecting unit 136 as it is. Then, before a sheet on which the print by the printer 112 of the first MFP 101 and which is newly printed is discharged to the discharge unit 114, the second MFP 121 feeds a sheet placed on the connecting unit 136. Therefore, plural sheets are not loaded on the connecting unit 136. In this way, the sheet is conveyed from the first MFP 101 to the second MFP 121.

A PC 138 is connected through a network 137 to the first MFP 101. A driver 139 in the PC 138 recognizes the first MFP 101 and the second MFP 121 as a single system using a color toner and a clear toner to transmit a print data to the system. This print data includes a data necessary for generating an intermediate language data to be described later and a data showing what post-processing (finishing processing and the like) should be performed to a output product after printing the intermediate language data.

The system shown in FIGS. 1A and 1B can print the color toner and the clear toner by one time's instruction from the PC 138. This system can print the clear toner on an entire surface of the sheet or can print the clear toner by limiting a specific color data or an object at print processing or copy processing.

The first MFP 101 using the color toner will be in detail explained. A network I/F 119 receives the print data and the like from the PC 138 and transmits a raster image to be described later, control data and the like to the second MFP 121. A controller 102 comprises a CPU 103, a hard renderer 109, an image processing unit 111, a power control unit 153 and a printer engine control unit 150. An interpreter 104 of the CPU 103 interprets a page description language (PDL) portion of the received print data to generate an intermediate language data (color) 105. The hard renderer 109 generates a raster image 110 from the generated intermediate language data (color) 105. In the present embodiment, there are some cases where the intermediate language data or the raster image is called an image data. The image processing unit 111 performs image processing (for example, screen processing) to the raster image 110 or an image read by a scanner 116. The printer engine control unit 150 is activated by receiving a status from a printer 112 to be described and issues a command such as sheet conveyance. The power control unit 153 performs on/off control of a power source of each unit at a power saving mode applied in the present embodiment. The on/off control of the power source includes switching between a sleeping mode and an active mode of each unit.

The printer 112 connected to the controller 102 is a printer for performing a print on a sheet by using a color toner such as cyan, magenta, yellow or black. In the present embodiment, the printer is explained as a four-color device, but may be a single-color device of black or a device of more than four colors. The printer 112 includes the feed unit 113 for feeding sheets and the discharge unit 114 for discharging printed sheets. A display device 115 displays an instruction to a user or UI showing a state of the first MFP 101. The scanner 116 is a scanner including an auto document feeder. A light source (not shown) is irradiated to stacked sheets or one sheet of document images by the scanner 116 to form a document reflective image on a solid-state image sensing device such as a CCD sensor by lens, and a raster-like image reading signal is obtained as an image data for printing from the solid-state image sensing device. An input device 117 is an interface for receiving input from a user. A memory device 118 is a hard disc device for storing a DRAM used as a work region for developing data or the like processed by the controller 102 or document files.

The interpreter 104, when a clear job is included in the received print data, generates an intermediate language data (clear) 106 in addition to the intermediate language data (color) 105. The clear job is to perform print processing to the print data using a clear toner. When an instruction of performing a print using the clear toner (clear job) is included in the print data, the intermediate language data (clear) 106 in addition to the intermediate language data (color) 105 is generated. As a data format of the intermediate language data, there is used "a named-profile" that is used for instructing the print using the clear toner on a designated portion. The processing using this data format will be explained. When an application is used to associate a specific character line with an input color, the named-profile corresponding to the character line is selected. Herein, when a specific character line is associated with the clear toner by a driver 139 of the PC 138, the named-profile corresponding to the character line is selected, and therefore a selection instruction of the clear toner is possible to a portion on which the print using the clear toner is desired to perform. The interpreter 104 produces a layer by extracting only the clear-designating portion to produce the intermediate language data (clear) 106. In addition, a soft renderer 107 converts the intermediate language data (clear) 106 into a raster image (clear) 108. The first MFP 101 transmits the raster image (clear) 108 generated as explained above through the network 120 to the second MFP 121. As the method of the instruction to the portion desiring the print using the clear toner, the named-profile is exemplified, but any profile may be used so long as the raster image 108 (clear) instructing the print using the clear toner can be generated.

In addition, the first MFP 101 transmits control data 140 through the network 120 to the second MFP 121. Herein, the control data 140 is information such as the sheet number, the sheet size, a type of media, and finisher settings set through the driver 139 from a user. In addition, the control data (information for the second engine) may include information on which one among the inputted image data is an image data as an object for printer output by the second MFP 121. Specifically flag information showing presence/absence of the image data as shown in FIG. 5 to be described later may be included. It should be noted that in the example of FIGS. 1A and 1B, the intermediate language data 105 for color is processed by the hard renderer 109 and the intermediate language data 106 for clear is processed by the soft renderer 107, but both of them may be processed by the hard renderer or the soft renderer. Hereinafter, there are some cases where both of the hard and soft renderers are not particularly distinguished and each of them is called simply a renderer.

Next, the second MFP 121 using the clear toner will be in detail explained. A network I/F 135 is connected through the network 120 to the network I/F 119 and exchanges data between the first MFP 101 and the second MFP 121. A controller 122 comprises a CPU 123, an image processing unit 124, a hard renderer 151, a printer engine control unit 152, and a power control unit 154. A printer 125 connected to the controller 122 is a printer for forming output data on a sheet using the clear toner. The printer 125 includes a feed unit 126 for feeding sheets and a discharge unit 127 for discharging sheets on which the output data is formed, and further includes a fixing unit (not shown) for fixing the toner transferred on the sheet. The feed unit 126 is connected through the connecting unit 136 to the discharge unit 114 of the first MFP 101 to automatically feed the sheet discharged from the first MFP 101. The automatic feeding means the event that, for example, the feed unit 126 is provided with a sensor (not shown) and when the sensor detects that the sheet discharged from the discharge unit 114 of the first MFP 101 is fed to the front end of a feeding tray, the feed unit 126 feeds that sheet. A finisher 128 has functions such as sorting and stapling. The discharge unit 127 of the printer 125 is connected to a feed unit 129 of the finisher 128, and the processing instructed by a user such as sorting or stapling is performed to the sheet, and the processed sheet is outputted using a discharge unit 130. Since a display device 131, a scanner 132, an input device 133 and a memory device 134 are similar to those in the first MFP 101, the explanation thereof is eliminated.

The second MFP 121 receives the raster image 108 for clear and the control data 140 from the first MFP 101, processes the raster image using the image processing unit 124 and controls the printer 125 or the finisher 128 using the control data 140.

Figure 2:
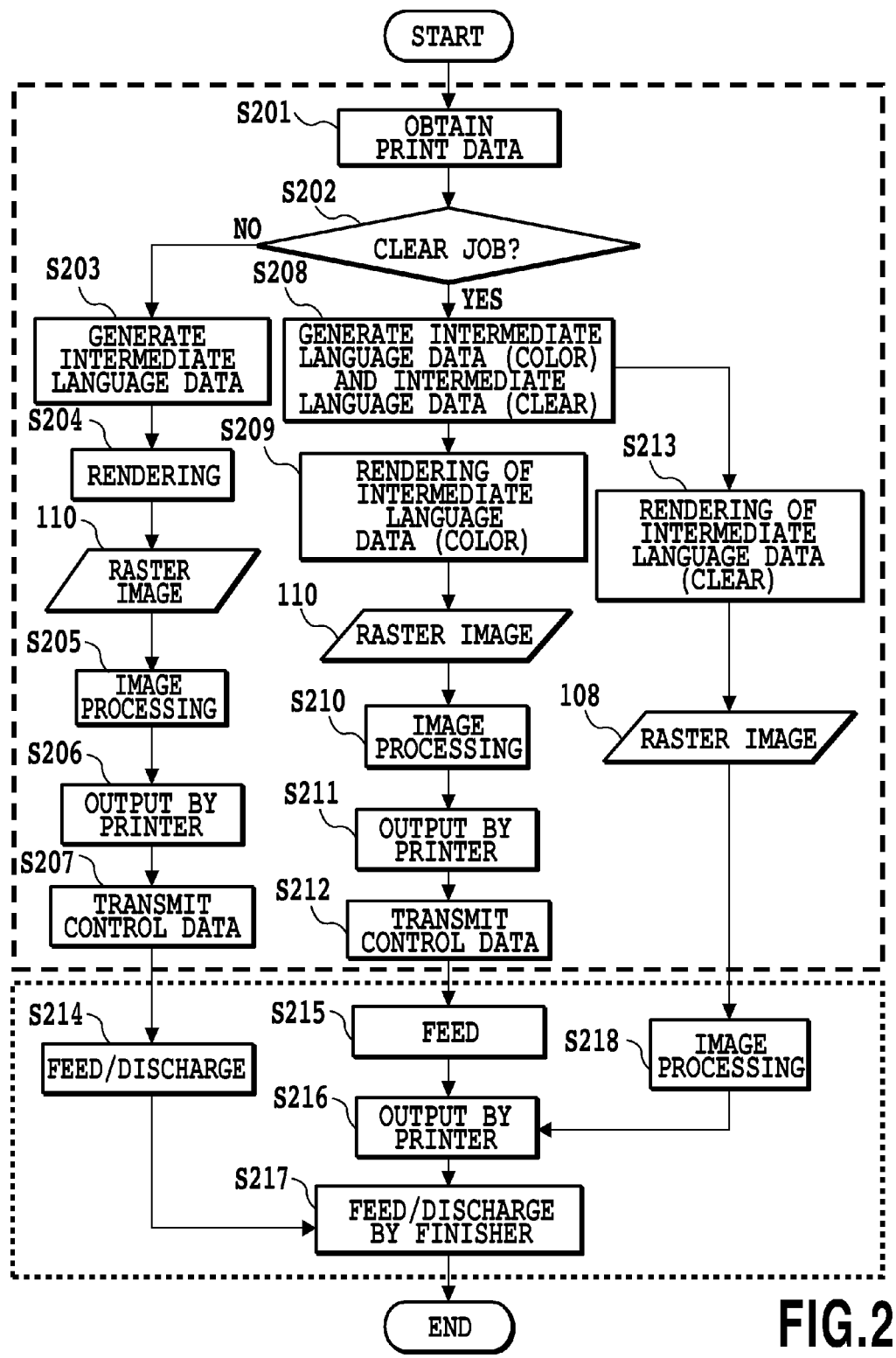
FIG. 2 is a flow chart showing the process order of print processing including a clear job according to the embodiment of the present invention.

Next, the process order for performing the print processing using the driver 139 from the PC 138 in the system of the present embodiment will be explained with reference to FIG. 2. It should be noted that the following processing explained in FIG. 2 shows the process order of the entire system explained in FIGS. 1A and 1B. The control processing for power saving will be explained separately. The processing from step S201 to step S213 is performed by the first MFP 101. The processing from step S214 to step S218 is performed by the second MFP 121. It should be noted that the processing to be hereinafter explained is performed by reading and executing programs stored in the memory device 118 by the CPU 103. The same processing is applied to the second MFP 121.

First, at step S201 the first MFP 101 obtains a print data transmitted from the PC 138 through the network I/F 119. As described before, the PC 138 can perform an instruction of a clear job for performing a print using a clear toner to a specific color or an object (character line) by associating the print data with a named-profile at the time of transmitting the print data. It should be noted that the print data is either a data having a single page as a print target or a data having plural pages as a print target. Hereinafter, "the data" includes both a case of showing a job constituted by a data for printing a plurality of pages and a case of showing a data for outputting an image corresponding to a single page. In any case, it is determined whether or not a print using the clear toner is instructed to the print data.

Next, at step S202, by referring to the named-profile or the like in the print data, it is determined whether or not the clear job is included in the print data. In a case where the clear job is not included, at step S203 the interpreter 104 produces the intermediate language data (color) 105. Further at step S204 the renderer 109 performs rendering to the intermediate language data (color) 105 to generate the raster image 110. At step S205 the image processing unit 111 performs the image processing to the raster image 110 and at step S206 the printer 112 outputs the image data on a sheet using the color toner of CMYK. Next, at step S207 the CPU 103 transmits the control data 140 to the second MFP 121.

In a case where at step S202 it is determined that the clear job is included in the print data, at step S208 the interpreter 104 generates the intermediate language data (color) 105 and the intermediate language data (clear) 106. In addition, at step S209 the renderer 109 performs rendering to the intermediate language data (color) 105 to generate the raster image 110. Next, at step S210 the image processing unit 111 performs the image processing to the raster image 110 and at step S211 the printer 112 outputs the image data on a sheet using the color toner of CMYK. Next, at step S212 the CPU 103 transmits the control data 140 to the second MFP 121. On the other hand, at step S213 the soft renderer 107 performs rendering to the intermediate language data (clear) 106 to generate the raster image 108 which will be transmitted to the second MFP 121. At step S215 the second MFP 121 refers to the control data 140 to perform the feeding. The sheet fed herein is the sheet printed out using the color toner of CMYK by the first MFP 101. On the other hand, at step S218 an image processing unit 124 performs the image processing to the raster image 108. At step S216 the printer 125 outputs the image data on the fed sheet using the clear toner. Finally at step S217 the finisher 128 performs the feeding and the outputting based upon the control data 140. As described above, by using the first MFP 101 and the second MFP 121 as the single printing apparatus, it is possible to output the color toner of CMYK and the clear toner on the sheet with one time's instruction from the driver 139. Herein, the first MFP 101 adopts the color toner of CMYK, but may adopt any kind of toner. Likewise, the second MFP 121 adopts the clear toner, but may adopt any kind of toner.

Next, the process order for performing the copy processing in the system of the present embodiment will be explained with reference to FIG. 3. It should be noted that in an example of FIG. 3, the processing of adding the clear toner is performed to a character portion among the image obtained by the scanner 116 to be described later. The processing from step S301 to step S312 is performed by the first MFP 101. The processing from step S313 to step S317 is performed by the second MFP 121. At step S301 the controller 102 receives an image (print data) obtained by the scanner 116 to obtain a RGB image 302. In addition, for example, the display device 115 in the first MFP 101 displays a copy button for instructing whether or not the clear toner is printed on a specific object in the image. In addition, at step S303 it is determined whether or not a clear copy job of adding the clear toner on an image of a copy target instructed to copy by a user is included. In a case where it is determined that the print data is the data of not adding the clear toner, at step S309 the image processing unit 111 performs the image processing to the RGB image 302 to print a CMYK image (binary value) 305.

On the other hand, in a case where in the determination processing at step S303 it is determined that the job is clear copy job, first at step S308 the image processing unit ill performs the image processing to the RGB image 302 to output a CMYK image (binary value) 309. Further, at image processing at step S308, the character portion is determined to obtain a character determination data 312. Since the determination of the character portion in the document is made by the known technology, the explanation is eliminated. It is possible to add the clear toner only to the character portion in the document by using the character determination data 312. In the present embodiment, the character determination data is used as the image data for adding the clear toner to the specific object, but any image data may be used, for example, by producing an image data by extracting only a data of a specific color phase or the like.

The character determination data 312 is transmitted as a raster image data for clear toner to the second MFP 121. Since steps S306 and S307 are similar to steps S206 and S207, the explanation is eliminated. In addition, since steps S310 and S311 are similar to steps S211 and S212 of FIG. 2, the explanation is eliminated. Further, since steps S313 to S317 are similar to steps S214 to S218, the explanation is eliminated.

Figure 3:
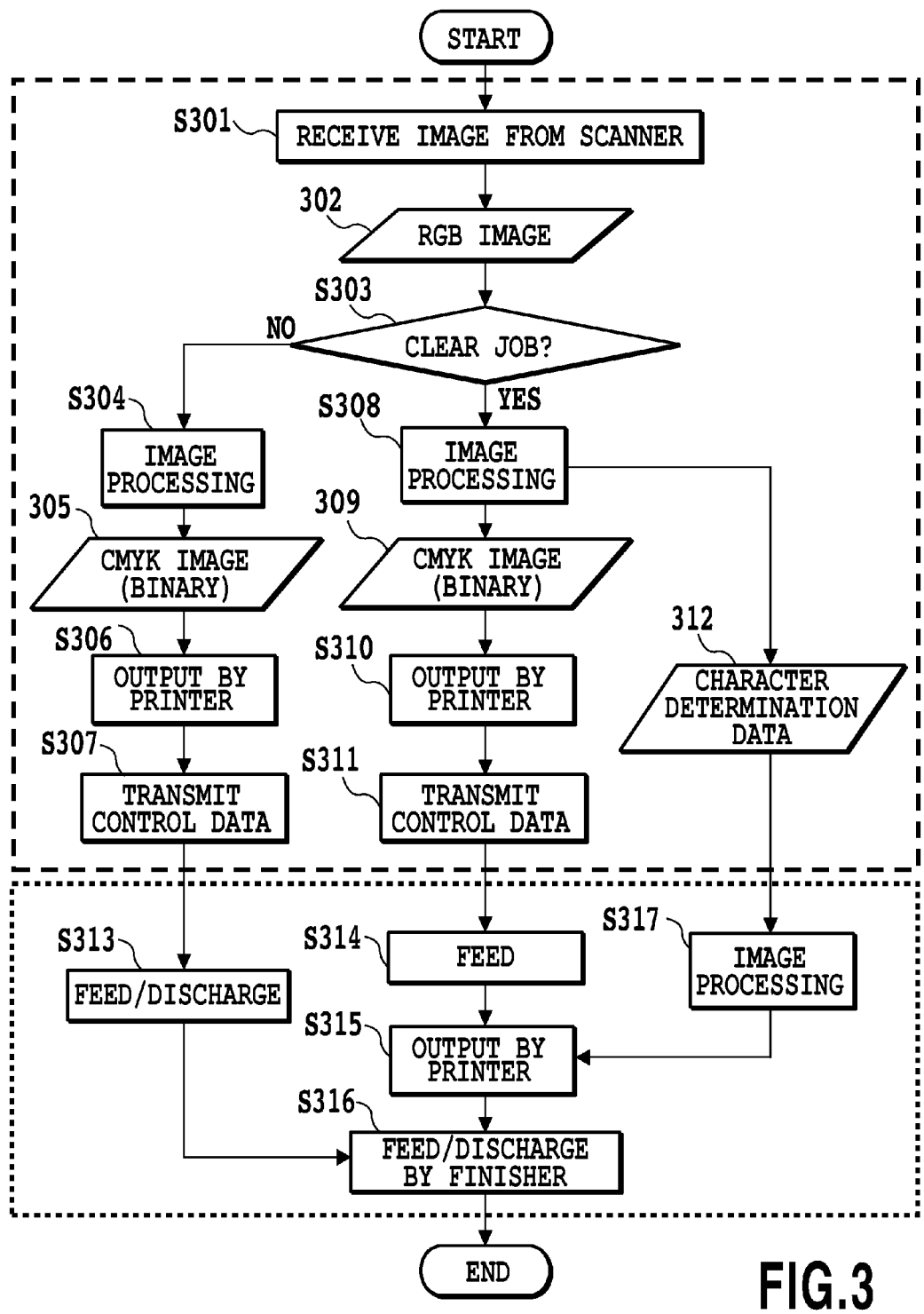
FIG. 3 is a flow chart showing the process order of copy processing including the clear job according to the embodiment of the present invention.

It should be noted that in the example shown in FIG. 2 and FIG. 3, there is explained an example where the first MFP 101 transmits the raster image 108 for clear to the second MFP 121 and the second MFP 121 performs the image processing using the raster image 108. However, there may be performed the processing in which the intermediate language data 106 for clear is transmitted from the first MFP 101 to the second MFP 121 and the raster image for clear is generated by the hard renderer 151 in the second MFP 121.

Next, there will be explained the featuring portion in the present embodiment, that is, the consumption power control of the controller and the printing apparatus body in a case of performing power saving corresponding to the content of the image data as a processing target.

Figure 4:
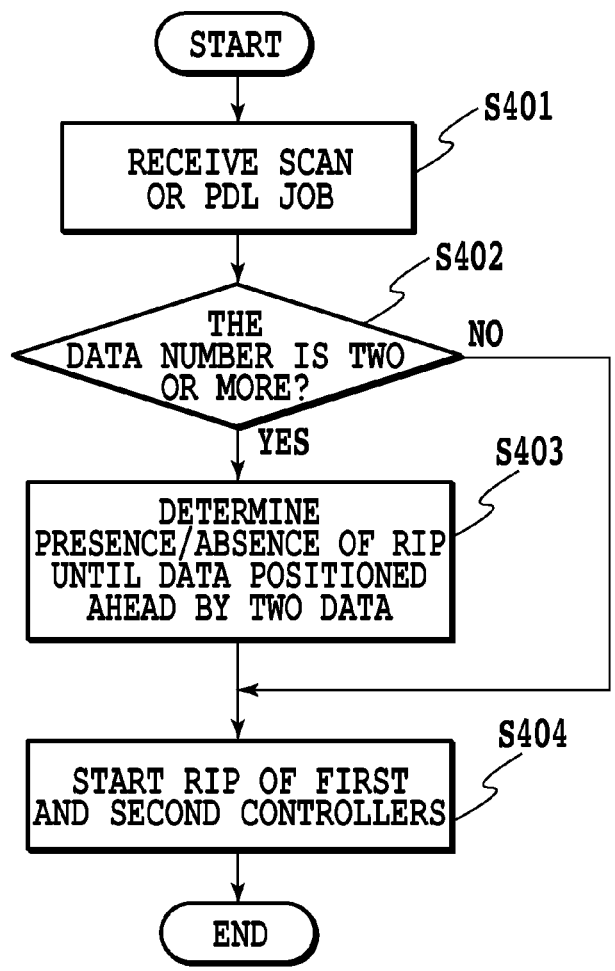
FIG. 4 is a flow chart showing the process order changing the processing by determining the data number of the job according to the embodiment of the present invention.

FIG. 4 is a flow chart for determining whether or not the power saving control according to the present embodiment is performed. Hereinafter, the process will be explained in order. In regard to a print data which the first MFP 101 has received at step S401, the CPU 103 of the first MFP 101 counts the number of processing target data (pages of image data) included in the print data (job data) at step S402. In a case where the number of data (pages of image data) is two or more, the print data will be a target to which control of the power saving explained in the present embodiment is applied. Accordingly at step S403 the interpreter 104 in FIG. 1A determines whether or not a page of image data to be processed by the controller 122 of the clear engine positioned ahead by two pages exists. That is, CPU 103 performs control in such a manner that the second controller 122 obtains information generated by the first controller 102 for the second engine 125 in regard to Nth page of image data which indicates whether or not a page in a print job being processed is to be processed by the second engine, where N is an integer of 2 or more, before the second controller performs image processing on data to be processed by the second engine for performing a print of "N−1"th page of image data using the second print material. On the other hand, in a case where it is determine that the number (pages of image data) is less than two, that is, a single page, since the sufficient power saving control can not be performed, the power saving control of the present embodiment may not be performed. In addition, after generating the intermediate data according to the flow explained in FIG. 2 (S203 and S208), at step S404 drawing processing of the first and second controllers shown in FIGS. 2 and 3 starts. The processing after step S409 is performed according to the flows explained in FIGS. 2 and 3. A point that at step S403 the power saving control is performed based upon whether or not a page of image data positioned ahead by the two pages includes an image data requiring the clear toner output processing of the second MFP 121 is the feature of the present embodiment. The detail thereof will be explained later.

FIG. 5 is a diagram expressing flag information showing presence/absence of a page of image data to be processed by a hard renderer for each page of image data used in the present embodiment. Page of each image data is composed of, image data (CMYK image data) printed using the CMYK toner, and image data (special color image data) using the clear toner. This flag information is generated by analysis of the interpreter 109 in FIG. 1A. FIG. 5 shows, for each page of image data, a relation between a flag showing presence/absence of each of a CMYK image data and an image data of a special color of clear or the like and a power state of each of controllers for processing these image data. As an example, since in the first page of image data, the image data of both the CMYK and the special color are included, each flag of the presence/absence is "1". Since in the second page of image data, the image data of CMYK is included, the flag of the CMYK is "1", but since the image data of the special color is not included, the flag is "0". The image processing unit 124 of the special color controller in the second controller 122 in the FIG. 1B temporarily makes the transition to a sleep state in response to the event that the flag is "0". The hard renderer 151 in the second controller 122 and the memory device 134 can temporarily make the transition to a sleep state together with it. Further, the fixing unit which constitutes the printer 125 and is other than the feed/discharge unit in regard to the sheet conveyance can be also temporarily transferred to a sleep state. It should be noted that in a case where the raster image rendered by the soft renderer 107 is transmitted from the first MFP 101, the hard renderer 151 in the second controller may make the transition to a sleep state from the beginning. It should be noted that the CPU 123 of the second MFP 121 receives the flag information shown in FIG. 5 as the control data (information for the second engine) from the first MFP 101 and it is possible to recognize which page(s) of image data the special color image is included in based upon this received flag information. Since in the fifth page of image data, the image data does not exist in both the CMYK and the special color, both of the flags are "0", and both the first controller 102 and the second controller 122 in FIGS. 1A and 1B make the transition to a sleep state.

In regard to the flag information shown in FIG. 5, the controller 102 of the first MFP 101 and the controller 122 of the second MFP 121 respectively can use information in common to both. However, for example, as to the controller 122 of the second MFP 121, it is only required to receive the flag information showing presence/absence of at least the image data of the special color. Therefore, the controller 102 of the first MFP 101 may transmit information other than the flag information for CMYK to the controller 122 of the second MFP 121. Further, the processing data (page) number shown in an example of FIG. 5 may be different from the page number of the document at outputting. For example, in a case where the page output such as "2 in 1" is made as a result of pagination at the time of printing the image data, the processing data (page) number shown in FIG. 5 is different from the page number of the document. The flag shown in FIG. 5 in regard to presence/absence of the types of image data may be sequentially transmitted to the second controller 122 for each time of analysis completion of each page of image data. Upon transmitting the raster image 108 generated at the soft renderer 107 of the first controller 102 to the second controller 122, the raster image 108 may be transmitted to be associated with the flag information showing presence/absence of the image data.

Figure 6:
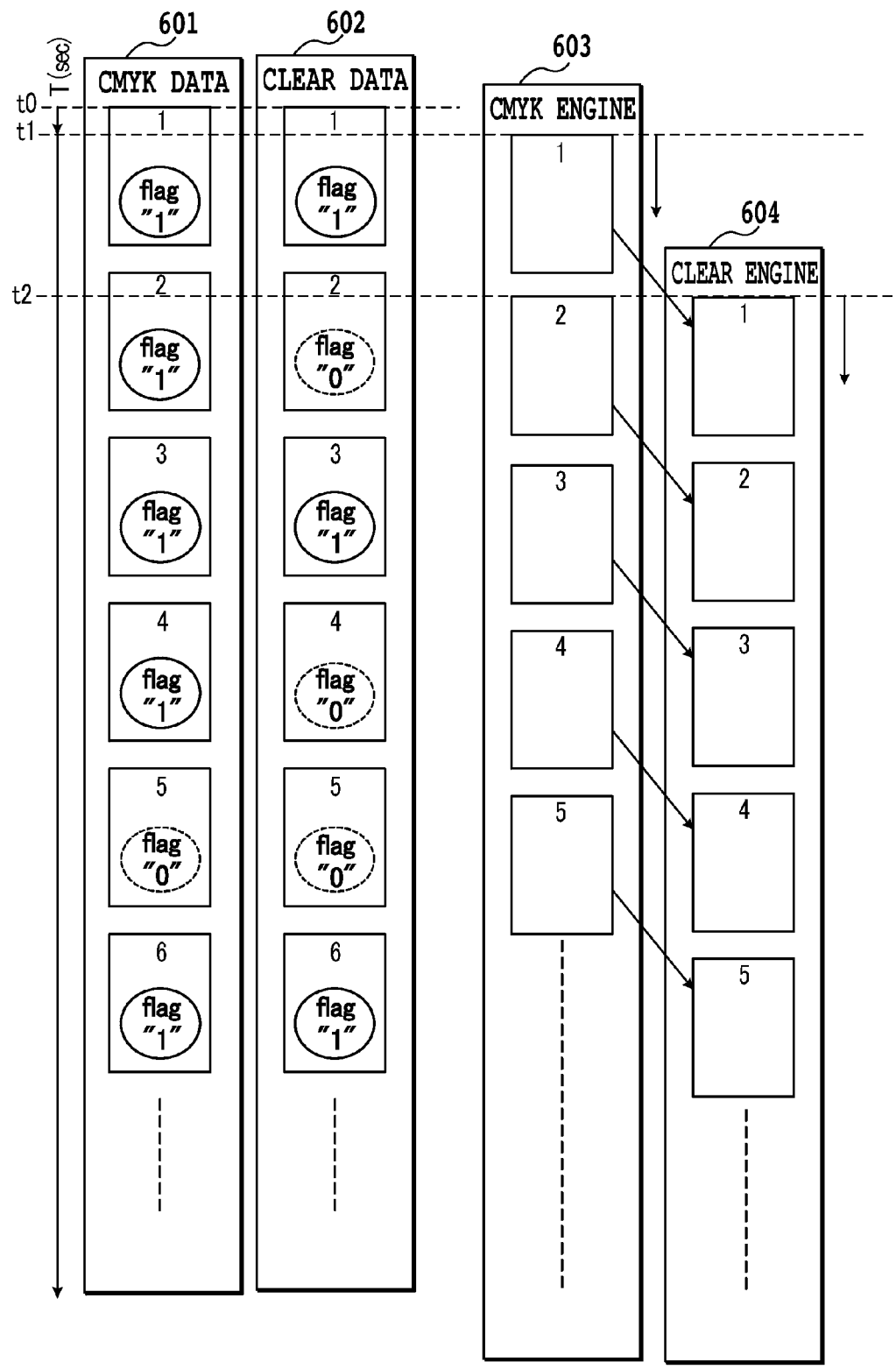
FIG. 6 is a diagram showing the flow of the conventional print processing.

Next, for explaining the effect of the power saving in the present embodiment, first the process order of the conventional power control will be explained with reference to FIG. 6 and FIG. 7. FIG. 6 shows a relation between timing of generating an intermediate data (intermediate language data) and time when an actual print operation starts in a case where the controllers of the two MFPs shown in FIGS. 1A and 1B do not perform the power saving control of the present embodiment. Each of the reference numerals 601 and 602 shows an intermediate data generated by data analysis of the interpreter 104 shown in FIG. 1A with the processing order of the page of image data and the flag information in FIG. 5. A page of image data having the description of flag "0" among the intermediate data of the reference numerals 601 and 602 shows that the image data of the corresponding color does not exist. The reference numerals 603 and 604 show the process order of the processing of the hard renderers 109 and 151 and the engine control units 153 and 152 provided in the printer controllers in the two MFPs in FIGS. 1A and 1B.

First, the processing of the interpreter 104 in FIG. 1A starts at time t0. Since the analysis of the interpreter is usually made ahead of the activation of the printer engine, the first controller 102 activates the hard renderer 109 of the first engine at time t1 when the data analysis corresponding to one band among the first page of image data as a processing target is completed. The first controller 102 further activates the printer engine (printer 112). At time t1, the printer engine control unit 150 of the MFP 101 in FIG. 1A starts a feeding operation of the printer 112 and in synchronization with it, the image processing unit 111 starts transmission of the first CMYL image data as the processing target. In addition, when the sheet on which the CMYK image data among the first processing target page of image data is printed is discharged from the discharge unit 114, at time t2 the sheet is conveyed to the feed unit 126 in the MFP 121 as the second engine in FIG. 1B and the printer engine control unit 152 in FIG. 1B starts the feeding of the printer 125. In synchronization with it, the image processing unit 124 transmits a clear (special color) image data among the first processing target page of image data.

Figure 7:
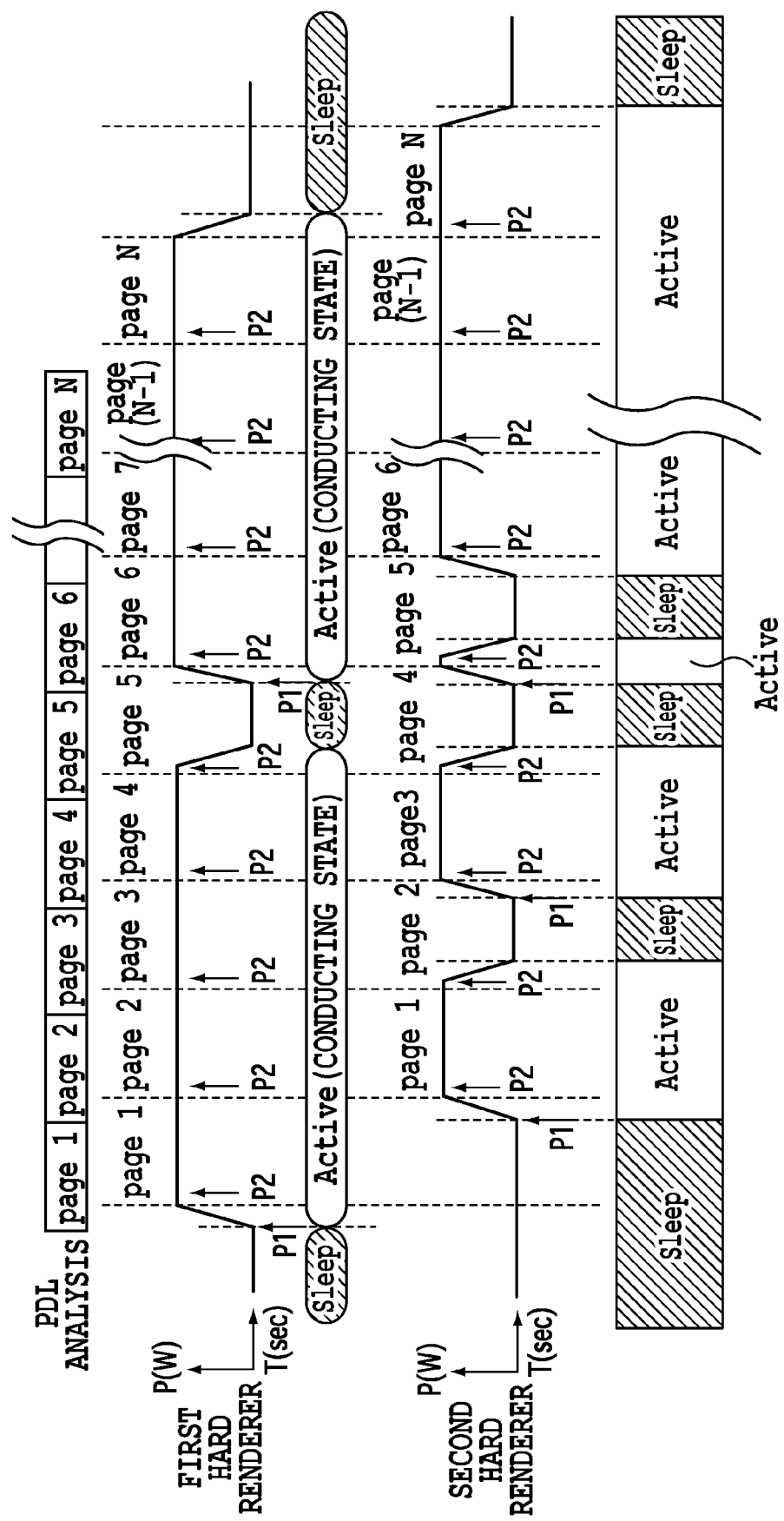
FIG. 7 is a diagram showing power control of the conventional processing.

FIG. 7 is a diagram showing a relation between consumption power (W) of the MFP controller 122 in FIG. 1B and an elapse of time at the time of performing the processing at timing shown in FIG. 6. In FIG. 7, P1 shows timing where each of the hard renderers 109 and 151 transfers from a sleep state to an activation, that is, an active state for RIP processing of the next page of image data. P2 shows timing of determining the flag showing presence/absence of the image in the corresponding page of image data. When at P2 it is confirmed that the flag is "1", the MFP controller 122 in FIG. 1B transferred to the active state at P1 continues to hold the active state. On the other hand, at a point where at P2 it is confirmed that the flag is "0", the power control unit 154 in FIG. 1B transfers each of the hard renderer 151, the memory device 134 and the image processing unit 124 to a sleep state. In the conventional power control shown in FIG. 7, for example, the second controller transfers the second hard renderer from an active state to a sleep state since at P2 the second controller recognizes the flag "0" in page number 2 of image data. In addition, the second controller returns the second hard renderer back to the active state immediately before page number 5 of the image data, but since the flag "0" is recognized, the second hard renderer is once more transferred to the sleep state.

Figure 8:
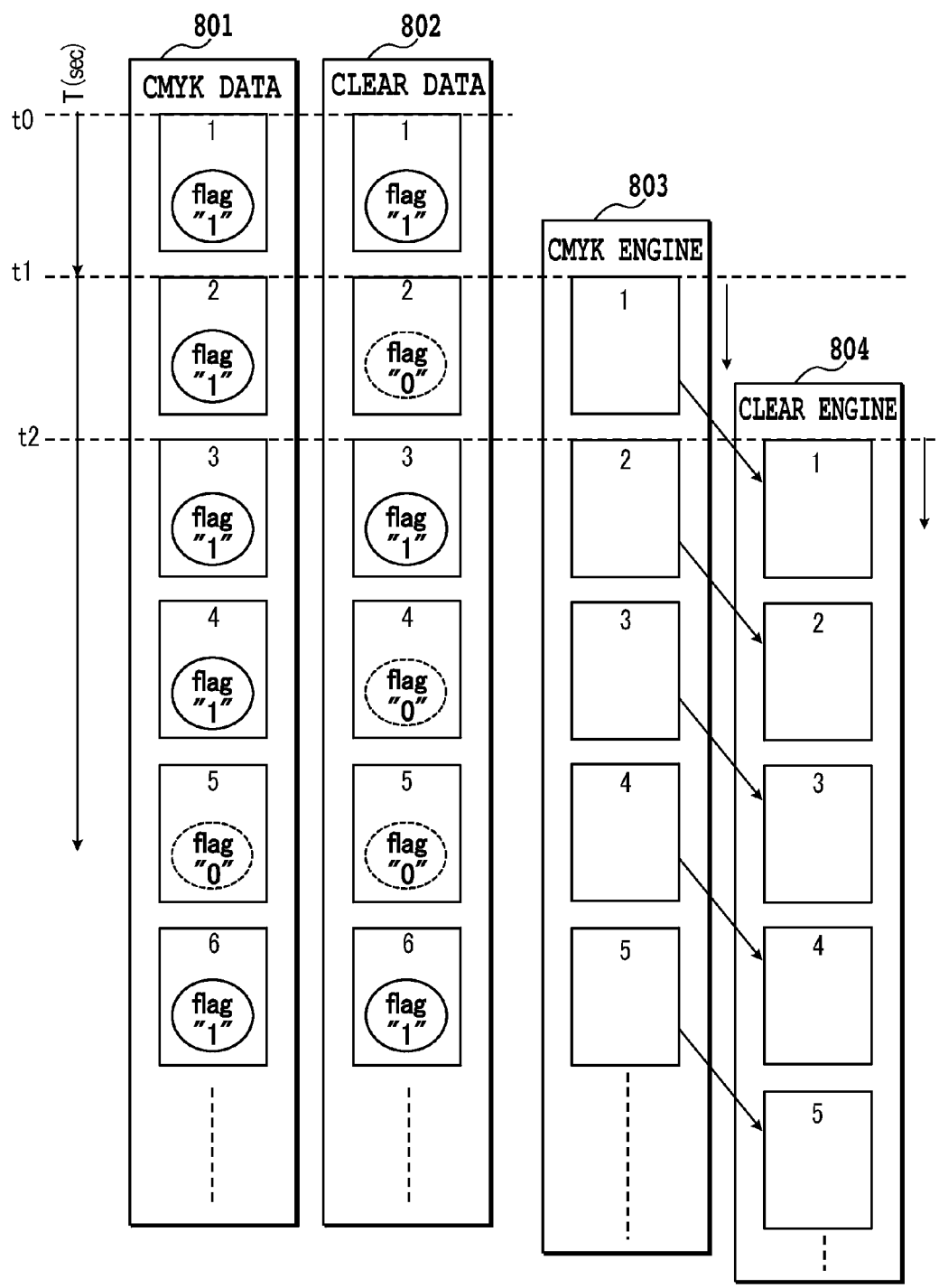
FIG. 8 is a diagram showing the flow of print processing according to the embodiment of the present invention.
Figure 9:
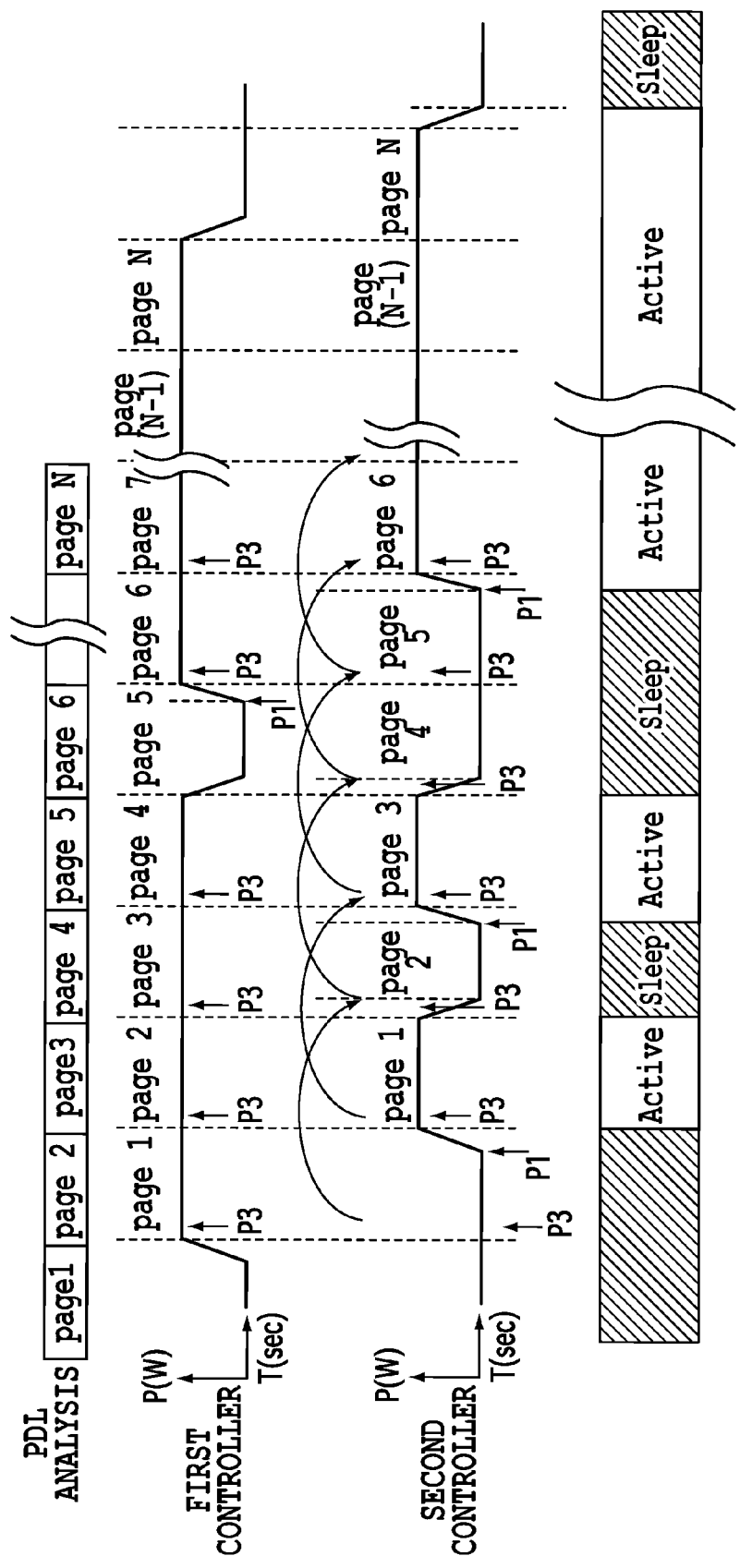
FIG. 9 is a diagram showing power control by the processing according to the embodiment of the present invention.

Next, the power saving control of the present embodiment will be explained with reference to FIG. 8 and FIG. 9. FIG. 8 and FIG. 9 each show a state of the consumption power in a case where the present embodiment is applied.

FIG. 8 shows a relation between timing where each of the two MFP controllers shown in FIGS. 1A and 1B generates an intermediate data and time when an actual print operation starts. The flag information of presence/absence of each page of image data is the same as that shown in FIG. 6. A difference from FIG. 6 is a point that at a point of t1 when the interpreter of the reference numerals 801 and 802 completes the processing to one page of image data, an activation of the reference numeral 803 corresponding hard renderer 109 shown in FIG. 1A and the first CMYK engine (printer) 112 are started. It should be noted that in FIG. 6 and FIG. 7, the timing of the activation of the hard renderer is explained as an example, but as described above, when the raster image (clear) is transmitted from the first MFP to the second MFP 121, there are some cases where the processing using the hard renderer of the second MFP is not performed. Therefore, hereinafter, for simple explanation, the timing of the activation of the printer engine will be explained as an example. At time t1, the processing to the second page of image data of the interpreter shown in the reference numerals 801 and 802 is also performed together. At time t2, an activation of the hard renderer 151 shown in FIG. 1B and an activation of the reference numeral 804 corresponding to the second clear engine (printer) 125 are started. At time t2, a sheet which is discharged from the CMYK engine and on which an image data as the first processing target page is printed is fed to the clear engine. Attention is paid to a point that at time t2, the analysis of the second page of image data by the interpreter 104 is already completed. Therefore, it is possible for the second MFP controller 122 to receive the flag information on presence/absence of the image positioned ahead by two pages and perform the power saving control by in advance estimating the next operation. In this way, in the example of FIG. 8, the controller 102 of the first MET delays the timing of activating the first engine (CMYK engine), and thereby the controller 122 of the second MFP can obtain the information of the processing target page of image data positioned ahead by the two pages.

It should be noted that it seems that in FIG. 8, for example, at time t2, the processing of the each controller and the processing of the each engine are performed in synchronization, but the processing is not necessarily performed in synchronization. That is, there occurs no problem so long as, before performing the processing by the second engine (clear engine), an intermediate data as the processing target image data positioned ahead by the two page is generated, which is obtained by the controller 122 of the second MET. Therefore, for example, the first engine (CMYK engine) may be controlled in such a manner that the first engine is activated at the same timing as in the example of FIG. 6 to delay the timing of discharging a sheet on which the first processed page of image data is printed. Even in this case, it is possible to provide a latency period in which the controller 122 of the second MFP obtains the intermediate data of the image data as the processing target positioned ahead by two data (pages of image data). In other words, this processing is the processing of controlling the first engine in such a manner that before the second controller performs the image processing of the image data as (N−1)th process target page of image data (here, N is an integral number of two or more), the second controller obtains information for the second engine in regard to the image data as Nth processing target page.

FIG. 9 is a diagram showing a relation between consumption power (W) of the MFP controller 122 in FIG. 1B and an elapse of time at the time of performing the processing at timing shown in FIG. 8. In FIG. 9, P1 shows timing when the power control unit 154 in FIG. 1B activates each of the hard renderer 151, the memory device 134 and the image processing unit 124 to transfer from a sleep state to an active state for RIP processing of the next page of image data. P3 shows timing of in advance determining the flag showing presence/absence of the special color image data among a page of image data as the processing target positioned ahead by two pages of image data. When at P3 it is confirmed that the flag is "1", the MFP controller 122 in FIG. 1B which has transferred to the active state at P1 continues to hold the active state even at a point where the processing of the present page of image data is completed. On the other hand, when at P3 it is confirmed that the flag is "0", the power control unit 154 immediately transfers each of the hard renderer 151, the memory device 134 and the image processing unit 124 to the sleep state at a point where the processing of the present page of image data is completed. As compared to the conventional power control in FIG. 7, the effect of the power elimination is found in view of a point that the second controller can transfer to the sleep state immediately at a point when the feeding of the page number 2 of image data and the page number 4 of image data starts and a point that it is not necessary for the second controller to once return back to the active state between the page number 4 of image data and the page number 5 of image data.

In regard to an actual consumption power amount, in a case of using FPGA in the image processing units 111 and 124 in FIGS. 1A and 1B, the consumption power of each amounts to the order corresponding to from ⅓ to ¼ of each of the MFP controllers 102 and 122.

Figure 10:
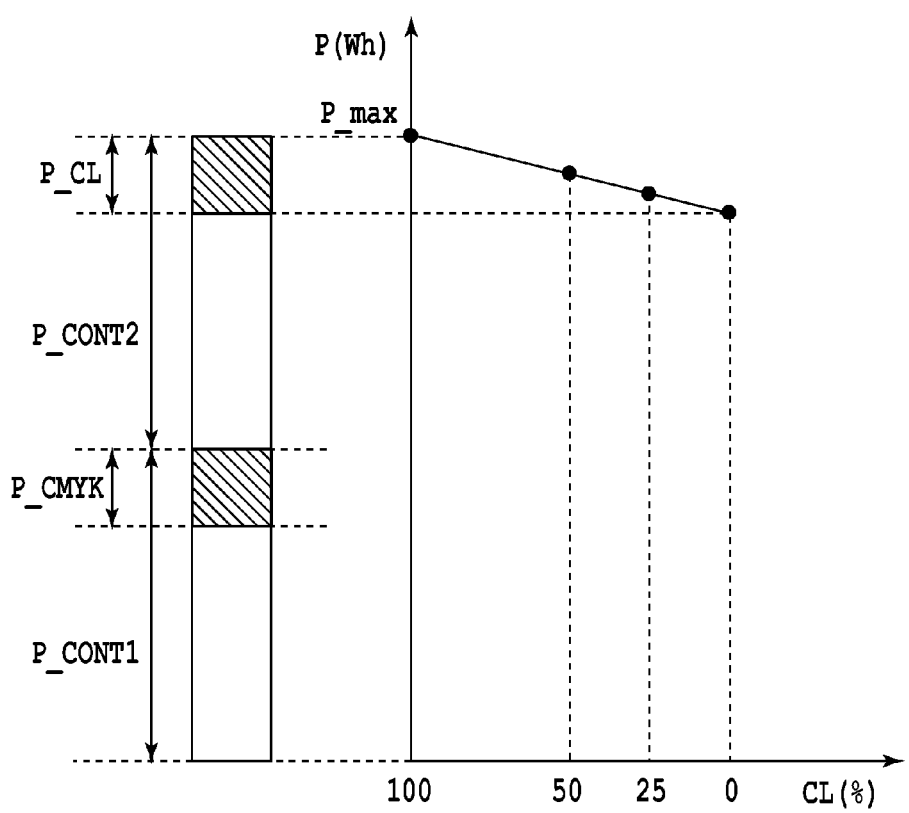
FIG. 10 is a diagram showing power elimination by the processing according to the embodiment of the present invention.

FIG. 10 shows a relation between a ratio CL (%) of presence/absence of the clear image data included in one job and a ratio of a flag showing consumption power P (Wh) of the MFP controllers 102 and 122 in FIGS. 1A and 1B. In this figure, P_CONT1 and P_CONT2 each are a consumption power amount of each of the controllers 102 and 122 and each of them is a sum of power amounts of the respective modules as shown in the following formula.

$$P\_CONT1 = P\_(CPU103) + P\_(\text{hard renderer } 109) + P\_(\text{image processing unit } 111) + P\_(\text{printer engine control unit } 150) \quad \text{(Formula 1)}$$

$$P\_CONT2 = P\_(CPU123) + P\_(\text{hard renderer } 151) + P\_(\text{image processing unit } 124) + P\_(\text{printer engine control unit } 152) \quad \text{(Formula 2)}$$

It should be noted that in the above description, for example, P_(CPU 103) shows consumption power used in the CPU 103. The same can be true of the description of the other module.

P_CMYK is consumption power of the module in regard to drawing processing of CMYK by subtracting the CPU 103 from P_CONT1 and is shown according to the following formula.

$$P\_CMYK = P\_CONT1 - P\_(CPU103) = P\_(\text{hard renderer } 109) + P\_(\text{image processing unit } 111) + P\_(\text{printer engine control unit } 150) \quad \text{(Formula 3)}$$

Likewise, P_CL is consumption power of the module in regard to drawing processing of clear and is shown according to the following formula.

$$P\_CL = P\_CONT2 - P\_(CPU123) = P\_(\text{hard renderer } 151) + P\_(\text{image processing unit } 124) + P\_(\text{printer engine control unit } 152) \quad \text{(Formula 4)}$$

P_max is the maximum value of power consumed by the two MFP controllers and corresponds to the maximum value in a case where a page of image data instructed to be printed using the clear toner is included in all the image data (print data, job data) for the processing target. The P_CL reduces in proportion to an increase in a ratio of CL (%). For example, in a case where a ratio of the image data in which the image instructed to be printed using the clear toner is not included in N processing target page of image data is estimated as 10%, the power saving of 10% is possible as compared to the conventional.

As explained above, deterioration of the performance by an application of the present invention based upon the present embodiment is only occurrence of delay in time necessary for the rendering processing of the head page(s) of image data, and the influence can be minimized. The present embodiment is positioned in a midpoint between a mode in which the analysis of the PDL, the rendering processing and the data transfer to the engine are performed simultaneously and in parallel, and a mode in which after the rendering processing of all the image data is developed to the hard disc (HDD), the data is transferred to the engine. That is, the time for analyzing the processing target drawing data positioned ahead by two pages is required, but the present embodiment can be realized in a range of not generating a delay until the rendering data of all the image data are prepared. In this way, the present embodiment generates a slightly few amount of the delay, but can effectively restrict the consumption power.

It should be noted that the above embodiment is explained based upon an example in which the second MFP 121 receives the raster image data for clear from the first MFP 101 and performs the output processing of the clear toner based upon the received raster image data. However, the above embodiment may be configured in such a manner that the second MFP 121 receives the intermediate language data (clear) 106 from the first MFP 101 and uses the raster image obtained as a result of rendering this data 106 using the hard renderer 151 to the output processing of the clear toner. As an alternative, the interpreter may be provided also in the second MFP 121 to generate the intermediate language data (clear) in the second MFP, thus performing the processing of the present embodiment.

Embodiment 2

According to Embodiment 1, it is described that print data (job data) is used only in a case of processing two or more pages of image data. On the other hand, when the present embodiment 2 is used, in a case where the print data (job data) shows the data for outputting the image corresponding to one page, the technology of the present embodiment can be applied when a plurality of such job data continue to be provided. Such job data includes a small amount of pages of image data.

The present embodiment provides means which receives a plurality of job data including a small amount of pages of image data which are printed together, thus performing the power saving control. Since the plurality of the image data are processed together, the processing of the job data which have previously arrived results in waiting. Therefore, the present embodiment, for handing whether or not the standby of the job data which have previously arrived is allowable to a user, provides means configured to select a power saving mode in advance prioritizing power saving.

Figure 11:
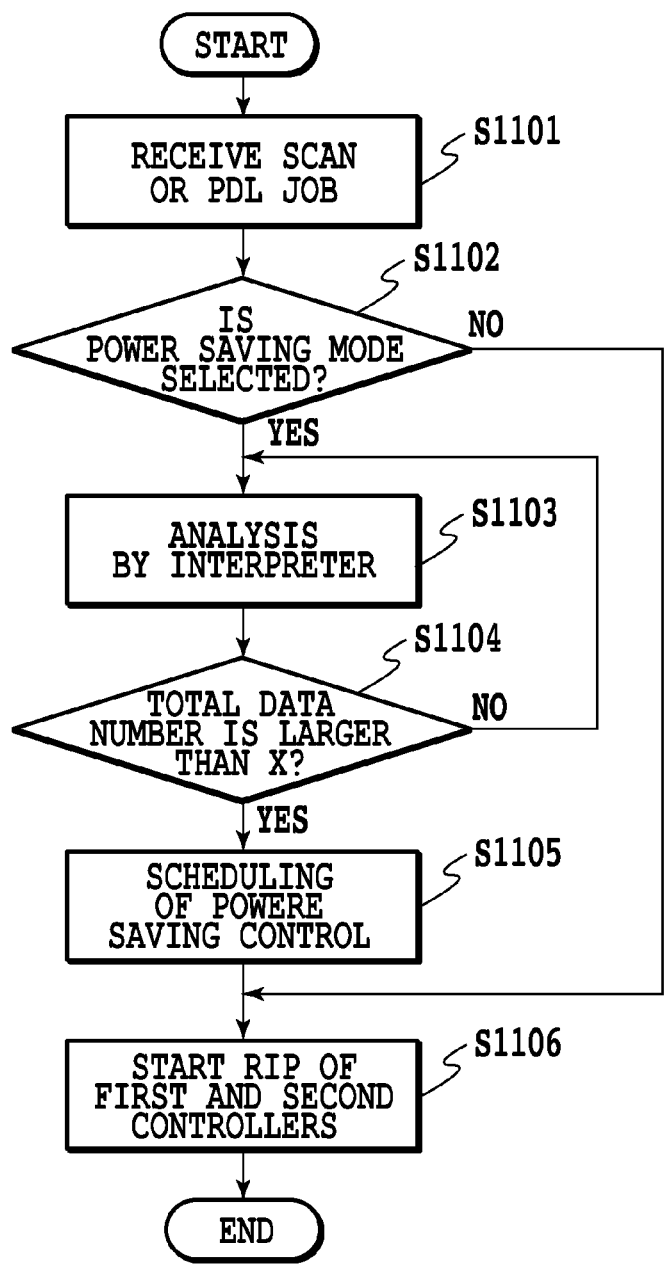
FIG. 11 is a flow chart showing the process order of print processing according to a different embodiment of the present invention.

FIG. 11 is a flow chart showing the process order of the processing in Embodiment 2. First, at S1101 a scan or a PDL job is received and at S1102 it is determined whether or not a power saving mode is selected. The power control units 153 and 154 in FIGS. 1A and 1B control whether or not the power saving mode is selected.

In a case of already selecting the power saving mode, at S1103 analysis by the interpreter 104 is performed to generate the flag information as shown in FIG. 5. At S1104 the processing at S1103 is repeated until a sum of the page numbers of the job data exceeds X pieces (X pages). It should be noted that X is any integral number of two or more. When the sum exceeds X pieces (pages), at S1105 the power control unit 154 in FIG. 1B performs scheduling of the power saving control. The scheduling of the power saving control means an adjustment of timing for performing the print processing or activating timing of each engine as explained in FIG. 8. Thereafter, at S1106 RIP of each of the first and second controllers is started.

Since the subsequent processing is the same as in FIG. 8 and FIG. 9, the explanation is eliminated. It should be noted that at S1104, there is explained an example of performing the print processing including the power saving control after accumulation of X or more pieces (pages) of the print job data. However, even in a case where the print job data is less than X pieces (pages), when a predetermined time elapses, the processing of starting the print processing of the print job data accumulated at that point may be performed.

Figure 12:
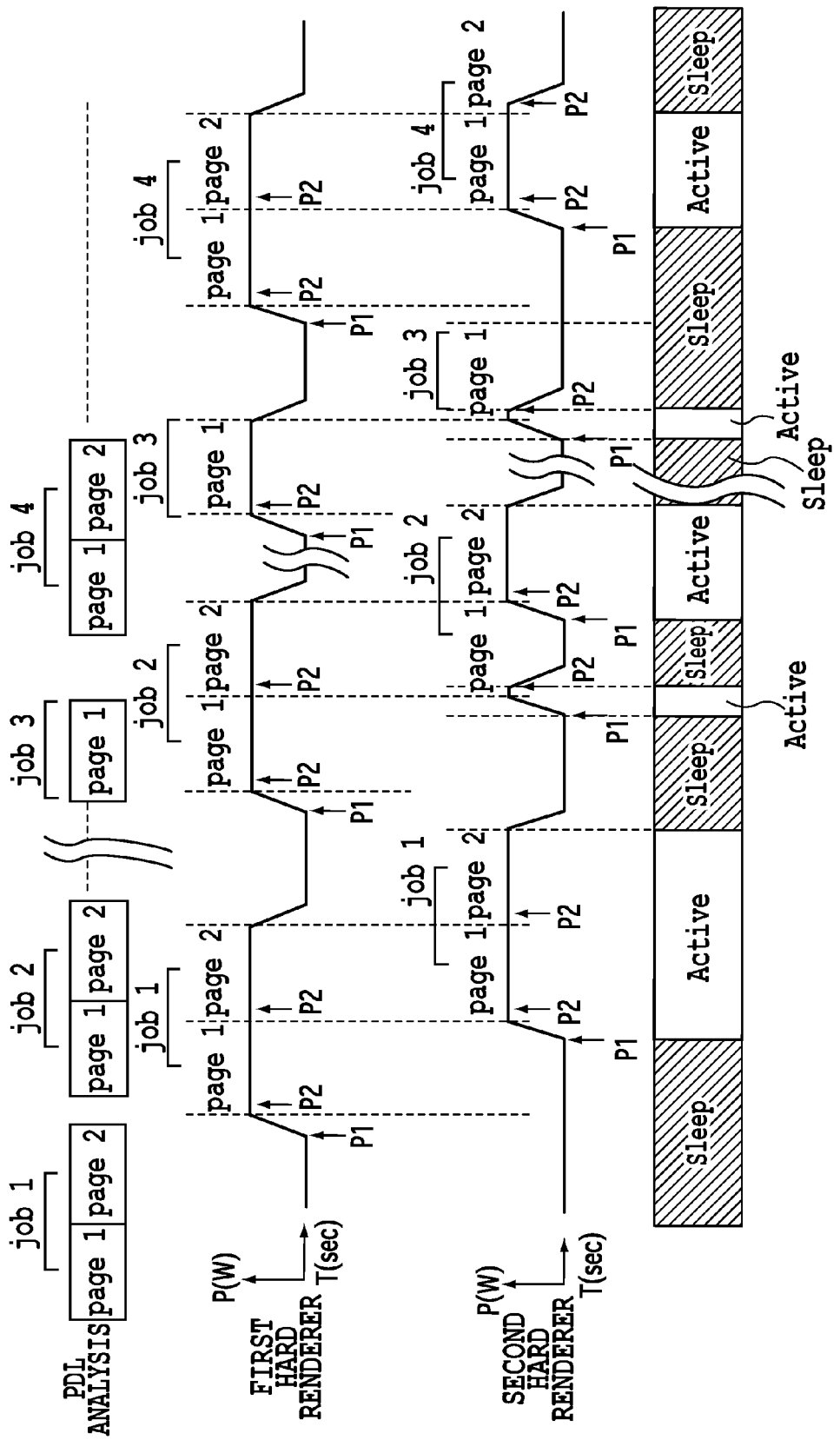
FIG. 12 is a diagram showing power control of the conventional different processing.

FIG. 12 is a diagram showing a relation between consumption power (W) of each of the first and second controllers at the time of intermittently processing job data including a small amount of pages of image data and an elapse of time. That is, FIG. 12 is the conventional example to which the flow in FIG. 11 is not applied. In FIG. 12, the first page of image data of job data 2, job data 3 and the second page of image data of job data 4 do not include clear data. Therefore, in FIG. 12, the second controller is in a sleep state at the time of performing the processing the first page of image data of job data 2, job data 3 and the second page of image data of job data 4. In addition, units other than the conveyance units (feed unit and discharge unit) during printing are also in a sleep state. However, since there exists a period of time between print processing of the respective job data, the controller is once restored to an active state and is then back to a sleep state immediately before the first page of image data of job data 2 and immediately before the first page of image data of job data 3, thus consuming the wasteful power.

Figure 13:
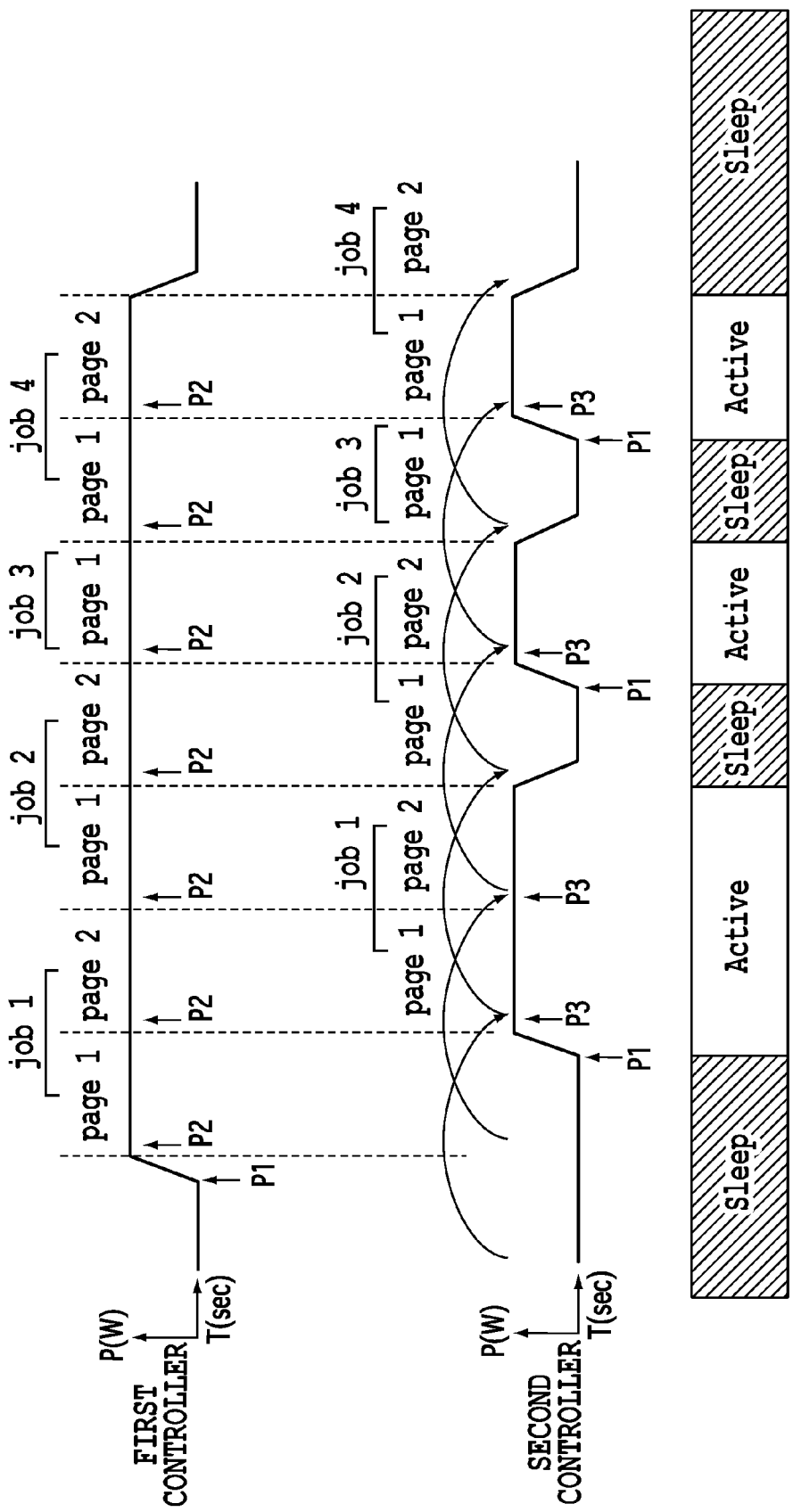
FIG. 13 is a diagram showing power control by the processing according to the different embodiment of the present invention.

FIG. 13 is a diagram showing a relation between consumption power (W) of each of the first and second controllers in the present embodiment and an elapse of time at the time of applying the flow in FIG. 11. The flag information in regard to presence/absence of the page of image data constituting each job data is the same as in FIG. 12. Herein a sum of seven pieces (pages) of image data from job data 1 to job data 4 is processed together. Since the presence/absence of the clear data is determined also in regard to the subsequent job data, the controller can transfer to a sleep state immediately at a point when the precedent job is completed. Therefore, it is possible to restrict wasteful power consumption during the processing of job data 2 and job data 3.

In the present embodiment, by collectively processing the plural job data transmitted for some period of time, it is possible to effectively perform the power saving control in response to presence/absence of the clear instruction of the image data in the same way as in Embodiment 1.

It should be noted that each of the above embodiments has explained the construction in which the second MFP 121 uses the clear toner, but may adopt the construction in which the second MFP 121 is provided with both the color toner and the clear toner in a usable manner. In this case, when the second MFP 121 uses only the clear toner, the power saving control explained in each of the above embodiments is performed.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-002814, filed Jan. 8, 2010, which is hereby incorporated by reference herein in its entirety.

What is claimed is:

1. A printing apparatus comprising a first engine for performing a print using a first print material connectable to a feed unit of a second engine for performing a print using a second print material, comprising:

a first controller configured to control the first engine; and
a second controller configured to control the second engine,
wherein the first controller comprises:
an obtaining unit configured to obtain a plurality of pages of image data for printing;
a generating unit configured to generate, by analyzing the obtained image data, information for the second engine including at least information showing whether or not each page in the obtained image data is to be processed by the second engine;
a transmitting unit configured to transmit the generated information for the second engine to the second controller of the second engine;
a determining unit configured to determine whether or not the number of pages of the obtained image data is two or more; and
a control unit configured to, in a case that the determining unit determines that the number of pages of the obtained image data is two or more, perform control in such a manner that the second controller obtains the generated information in regard to Nth pages of image data, where N is an integer of 2 or more, before the second controller performs image processing on data to be processed by the second engine for performing a print of "N−1"th page of image data using the second print material, and in a case that the determining unit determines that the number of pages of the obtained image data is less than two, perform control in such a manner that the second controller obtains the generated information in regard to Nth page of image data before the second controller performs image processing on data to be processed by the second engine for performing a print of Nth page of image data using the second print material, and
wherein the second controller comprises:
an image processing unit configured to perform the image processing on the data to be processed by the second engine; and
a power control unit configured to reduce power supplied to the image processing unit in a case that the transmitted information for the second engine does not include the data to be processed by the second engine, and to supply power to the image processing unit in such a manner that the image processing unit performs image processing in a case that the transmitted information for the second engine during reduction of power includes the data to be processed by the second engine.

2. The printing apparatus according to claim 1, wherein the control unit of the first controller is configured to delay an activation of the first engine until the generating unit completes the analysis of the first page of image data to be printed.

3. The printing apparatus according to claim 1,
wherein the power control unit of the second controller is configured to refer to a structure of the image data to be processed using the transmitted information for the second engine, and in a case that the structure includes a page of image data in which no data to be processed by the second engine is included, the power control unit of the second controller performs the power control of the image processing unit to control the consumption power.

4. The printing apparatus according to claim 1, wherein the generating unit of the first controller is configured to generate image data to be printed by the first engine and image data to be printed by the second engine by analyzing the obtained image data, wherein the generating unit of the first controller generates the information for the second engine so as to include the generated image data printed by the second engine in the information for the second engine.

5. The printing apparatus according to claim 1, further comprising:
selecting unit configured to select whether or not a power saving mode for performing power saving control is used to the obtained print data,
wherein when the power saving mode is selected, the first controller receives pages of image data until the image data is accumulated to a predetermined number of pages, and when the image data reaches the predetermined number of pages of image data, the first controller is configured to transmit the information for the second engine to the second engine and to also start the activation of the first engine.

6. A printing apparatus comprising:
a first engine for performing a print using a first print material, the first engine being connectable to a feed unit of a second engine of a different printing apparatus, which second engine is controlled by a second controller and is configured to perform a print using a second print material; and
a first controller configured to control the first engine, the first controller comprising:
an obtaining unit configured to obtain a plurality of pages of image data for printing;
a generating unit configured to generate, by analyzing the obtained image data, information for the second engine including at least information showing whether or not each page in the obtained image data is to be processed by the second engine;
a transmitting unit configured to transmit the generated information for the second engine to the second controller;
a determining unit configured to determine whether or not the number of pages of the obtained image data is two or more such that the different printing apparatus reduces supplied power for an image processing in a case that the transmitted information for the second engine does not include the data to be processed by the second engine, and such that the different printing apparatus supplies power for the image processing in a case that the transmitted information for the second engine during reducing power includes the data to be processed by the second engine;
a conveyance unit configured to convey sheets on which data is printed by the first engine to the second engine; and
a control unit configured to control the transmitting unit and the conveyance unit such that the generated information regarding the Nth page of the image data, where N is an integer of two or more, is sent to the second controller before the conveyance unit conveys to the second engine the page on which the N−1th page of image data is printed in a case that the determining unit determines that the number of pages of the obtained image data is two or more, and such that the generated information regarding the Nth page of the image data is sent to the second controller before the conveyance unit conveys to the second engine the page on which the Nth page of image data is printed in a case that the determining unit determines that the number of the obtained image data is less than two.

7. A method of controlling a printing apparatus, the printing apparatus comprising a first engine for performing a print using a first print material connectable to a feed unit of a second engine for performing a print using a second print material, wherein the printing apparatus further comprises a first controller configured to control the first engine and a second controller configured to control the second engine, the method comprising:
in the first controller:
obtaining a plurality of pages of image data for printing;
generating information for the second engine including at least information showing whether or not each page in the obtained image data is to be processed by the second engine by analyzing the obtained image data;
transmitting the generated information for the second engine to the second controller of the second engine;
determining whether or not the number of pages of the obtained image data is two or more and
controlling in such a manner that the second controller obtains the generated information in regard to Nth pages of image data, where N is an integer of 2 or more, before the second controller performs image processing on data to be processed by the second engine for performing a print of "N−1"th page of image data using the second print material in a case that the determining step determines that the number of pages of the obtained image data is two or more, and in such a manner that the second controller obtains the generated information in regard to Nth page of image data before the second controller performs image processing on data to be processed by the second engine for performing a print of Nth page of image data using the second print material in a case that the determining step determines that the number of pages of the obtained image data is less than two;
in the second controller:
performing the image processing on the data to be processed by the second engine; and
performing power control to reduce power supplied to the image processing step in a case that the transmitted information for the second engine does not include the data to be processed by the second engine, and to supply power to the image processing step in such a manner that the image processing step performs image processing in a case that the transmitted information for the second engine during reduction of power includes the data to be processed by the second engine.

8. A printing method using a printing apparatus, the printing apparatus comprising a first engine for performing a print using a first print material, the first engine being connectable to a feed unit of a second engine of a different printing apparatus, which second engine is controlled by a second controller and is configured to perform a print using a second print material; and a first controller for controlling the first engine, the method comprising:
in the first controller:
obtaining a plurality of pages of image data for printing;
generating information for the second engine including at least information showing whether or not each page in the obtained image data is to be processed by the second engine by analyzing the obtained image data;
transmitting the generated information for the second engine to the second controller of the second engine;
determining whether or not the number of pages of the obtained image data is two or more such that the different printing apparatus reduces supplied power for an image processing in a case that the transmitted information for the second engine does not include the data to be processed by the second engine, and such that the different printing apparatus supplies power for the image processing in a case that the transmitted information for the second engine during reducing power includes the data to be processed by the second engine;

conveying sheets on which data is printed by the first engine to the second engine; and controlling the transmitting step and the conveying step such that the generated information regarding the Nth page of the image data, where N is an integer of two or more, is sent to the second controller before the conveying step conveys to the second engine the page on which the N−1th page of image data is printed in a case that the determining step determines that the number of pages of the obtained image data is two or more, and such that the generated information regarding the Nth page of the image data is sent to the second controller before the conveyance step conveys to the second engine the page on which the Nth page of image data is printed in a case that the determining step determines that the number of the obtained image data is less than two.

9. A non-transitory computer-readable storage medium storing a program which, when executed by a computer, causes the computer to carry out the method of claim 7.

10. A non-transitory computer-readable storage medium storing a program which, when executed by a computer, causes the computer to carry out the method of claim 8.

* * * * *